United States Patent [19]

Sakai

[11] Patent Number: 4,855,945
[45] Date of Patent: Aug. 8, 1989

[54] PORTABLE FOOD-CONSTITUENT-AMOUNT DISPLAY AND CALCULATING SYSTEM, AND DEVICE TO OPERATE THE SYSTEM

[76] Inventor: Ritsuko Sakai, 21-10-506, Mitsuzawa-Shimomachi, Kanagawa-ku, Yokohama-shi, Kanagawa 221, Japan

[21] Appl. No.: 802,359

[22] Filed: Nov. 27, 1985

Related U.S. Application Data

[63] Continuation of Ser. No. 000,232, May 27, 1984, abandoned.

[30] Foreign Application Priority Data

Mar. 27, 1984 [JP] Japan ................ 59-60332
Mar. 27, 1984 [JP] Japan ................ 59-60333

[51] Int. Cl.$^4$ .................................................. G06F 15/42
[52] U.S. Cl. ........................... 364/709.02; 364/413.29
[58] Field of Search ... 364/709, 715, 710, 900 MS File, 364/413

[56] References Cited

U.S. PATENT DOCUMENTS

| | | | |
|---|---|---|---|
| 4,100,401 | 7/1978 | Tutt et al. | 364/413 |
| 4,212,079 | 7/1980 | Segar et al. | 364/900 |
| 4,244,020 | 1/1981 | Ratcliff | 364/413 |
| 4,321,674 | 3/1982 | Krames et al. | 364/413 |
| 4,380,802 | 4/1983 | Segar et al. | 364/900 |
| 4,575,804 | 3/1986 | Ratcliff | 364/715 |

FOREIGN PATENT DOCUMENTS

| | | |
|---|---|---|
| 2901174 | 8/1980 | Fed. Rep. of Germany . |
| 186870 | 10/1983 | Japan . |
| 148973 | 8/1984 | Japan . |

OTHER PUBLICATIONS

Moran, Electronic Diet Controller, Computer Design, Aug. 1977, pp. 116-118.

*Primary Examiner*—Gary V. Harkcom
*Assistant Examiner*—Tan V. Mai
*Attorney, Agent, or Firm*—Browdy and Neimark

[57] ABSTRACT

A portable system gives information on the amounts of constituents of foods for health control. The system tells the amounts of nutritive constituents of foods and the total amount of nutritive constituents of foods taken a day by arithmetic operations, and determines excessive or insufficient amounts of constituents by comparison between the total amount taken a day and the necessary amounts. A small, portable calculator is provided with an input section having a keyboard for giving necessary commands with alphabetic characters A to Z, the numerals 0 to 9, $=$, $-$, $\times$, $\div$, etc. to enter food items and the amounts of nutritive constituents. The portable calculator calculates the amounts of nutritive constituents of meals of the day, breakfast, lunch, supper and snack separately or in the aggregate. The excess/deficiency amounts of each nutrient is displayed in graphic forms, by symbols or animation.

16 Claims, 3 Drawing Sheets

PORTABLE FOOD-CONSTITUENT-AMOUNT DISPLAY AND CALCULATING SYSTEM, AND DEVICE TO OPERATE THE SYSTEM

This is a continuation of parent application Ser. No. 000,232, filed May 27, 1984, now withdrawn in favor of the present invention.

BACKGROUND OF THE INVENTION

The invention relates to a portable system which gives information on the amounts of constituents of foods for health control.

An object of this invention is to provide a system which tells the amounts of nutritive constituents of foods and the total amounts of nutritive constituents of foods taken a day, by arithmetic operation of the amounts of the constituents, of the respective foods taken on that day.

Another object of this invention is to provide a system which reports excessive or insufficient amounts of constituents by a comparison between the total amounts of constituents of foods taken a day and the daily necessary amounts of the constituents.

A further object of this invention is to provide a device to operate said system.

More specifically, the object of this invention is to provide a small, portable device which calculates the amounts of nutritive constituents of the meals of a day, namely breakfast, lunch, supper and snacks separately or in the aggregate, and which also reports what nutritive constituents are excessive or insufficient and by how much, by a display of information in graphic forms or by symbols or animation.

The method of health control varies from one person to another according to the distinction of sex, age, constitution and physical condition. Basically, the important requirements are meals which supply balanced nutritive constituents and a proper amount of exercise.

There has been a mounting concern about health control in recent years. Not only sick persons and dieticians who need to pay special attention to the nutritive constituents of foods, but also people at large, are keenly aware of the need to know the amounts of nutritive constituents contained in meals of the day and want to see if their meals are well-balanced in nutrition.

If, for example, total calorie intake is more than the calories consumed in a day, the excessive calories are conducive to obesity. Obesity gives rise to various geriatric disorders.

To check the possibility of obesity, food constituent tables have been formulated. To examine the contents of daily food intake involves a number of discontinuous processes. This is troublesome work which cannot be done by everybody and at any time.

This work of nutrition check requires steps as follow:

(1) data must be prepared, which includes a table showing the names of foods and the amounts of nutritive constituents contained therein;

(2) from this data, the names of foods must be determined, the amounts of their nutritive constituents must be added up, and the result of addition must be recorded;

(3) then, the amounts of constituents necessary for maintenance of health must be decided on, and excessive or insufficient amounts calculated by comparing the previously recorded amounts of constituents of foods in question with the necessary amounts for hour health; and (4) the kinds of foods which are to be decreased or added must be determined from the data of step (1) above with reference to the calculated figures of excess or deficiency in nutrition.

Therefore, this work requires the preparation (or purchase) of data, providing for storage area and the calculation of data, and a memory means for storage of the calculated results. This series of processes is so troublesome that this work is not practiced widely, despite the general awareness of the need to know the kinds and amounts of nutritive constituents contained in foods.

SUMMARY OF THE INVENTION

It is, accordingly, an object of this invention to provide a system which carries out the above-mentioned series of processes with extreme ease by embodying the invention in a small, portable device equipped with a character-input keyboard, whereby the amounts of constituents of each food and those of plural meals can be retrieved and displayed instantly and, further, excessive or insufficient amounts of constituents can be displayed.

BRIEF DESCRIPTION OF THE DRAWINGS

The drawings shown one embodiment of this invention.

DETAILED DESCRIPTION OF PREFERRED EMBODIMENT

Figure 1:
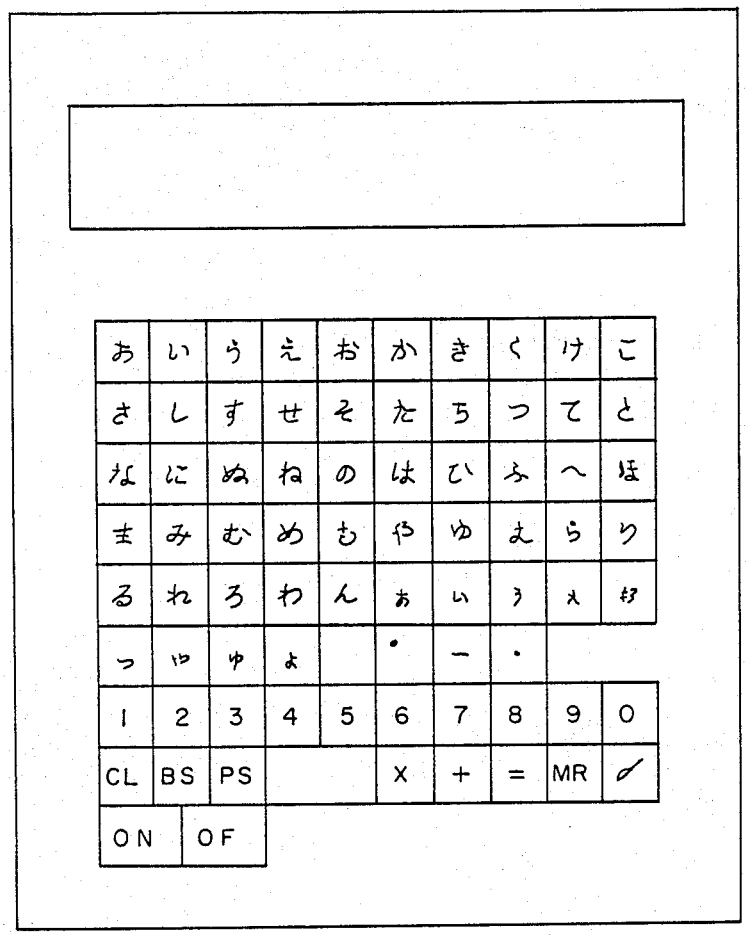
FIG. 1 illustrates an external view of one embodiment of this invention.

Referring to the drawings, a small electronic calculator as a preferred embodiment of this invention will be described in the following.

FIG. 1 is an illustration of an external view of a device which operates a system of this invention.

The device consists of a case-covered main body (1), a display section (2) and an input section (3) having a keyboard. The display section (2), which uses liquid crystal display elements or light-emitting diodes, is capable of displaying at least food names, and the kinds and amounts of nutritive constituents contained therein.

The input section (3) is provided with a ten-key pad and a number of function keys, together with the Japanese "kana" phonetic character keys or alphabetic character keys by which food names can be input.

Figure 2:
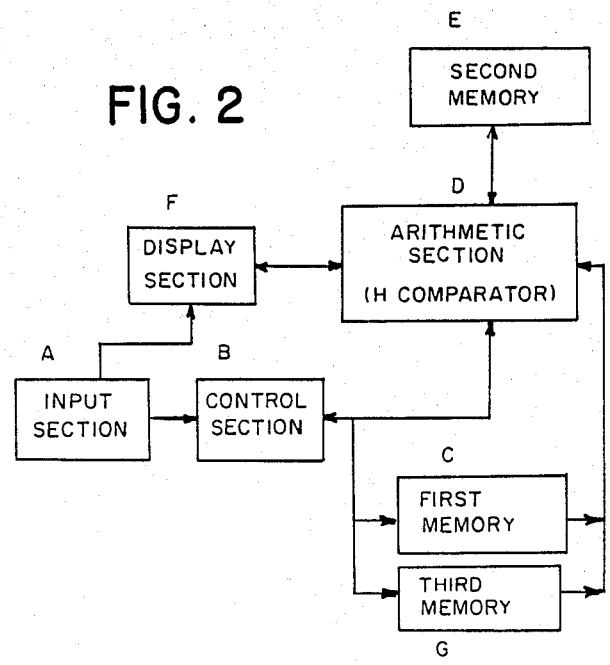
FIG. 2 is a block diagram of said system.

Next, the configuration of the control circuit which is mounted in the case-covered main body will be described referring to FIG. 2.

This invention contemplates a small, portable calculator provided with an input section having a character keyboard whereby the names of foods can be input directly. The calculator has a food data memory which stores the names of foods and the amounts of their constituents. The calculator has a means by which to read out from the food data memory the amount of one or more constituents of a food name which is input, and a display which shows the food name and the amount of each constituent read out from the food data memory.

The calculator has an arithmetic and control section at which the amount of each constituent is corrected when necessary. Arithmetic operations of the contents of constituents of displayed food names are performed, and all-food data memory stores the result of arithmetic operations. By the arithmetic and control section and all the food data memory, the total amounts of constituents in separate meals and in plural meals can be calculated and stored. Said calculator has a necessary constituent-amount memory, which stores the necessary amounts of constituents for a person who is seeking information on nutrition.

An object of the invention is to provide a portable constituent-amount display calculator which, when commanded, compares the total amount of constituents of food taken a day with the necessary amount, and tells how much is surplus or deficient.

Another object of the invention is to provide a system which operates said calculator.

The part A is a key input section which outputs commands corresponding to the key operations of the keyboard. The part B is a control block which controls the system of this invention according to commands which are input. The part C is a food data memory (first memory) which stores food names and the amounts of nutritive constituents they contain. The part D is an arithmetic block where data is multiplied by a coefficient input, when necessary, from the input section. Other arithemtic operations of the amounts of constituents of various foods, the names of which are input, are performed. The part E is an all-food data memory (second memory) which stores the food names and the amounts of constituents that are displayed at a display section F, and the total amounts of constituents of different foods, separately, and the total amounts of constituents of plural meals. The part G is a data memory (third memory) which stores data of the necessary amounts of constituents for a person who wants to control daily nutrition intake. The section H is a comparing function which compares the total amounts of constituents taken with its necessary amount, and calculates the amount of excess or deficiency.

Needless to say, the above-mentioned first, second and third memories may be placed in the same memory device in a manner that those memories can perform the respective functions.

Figure 3:
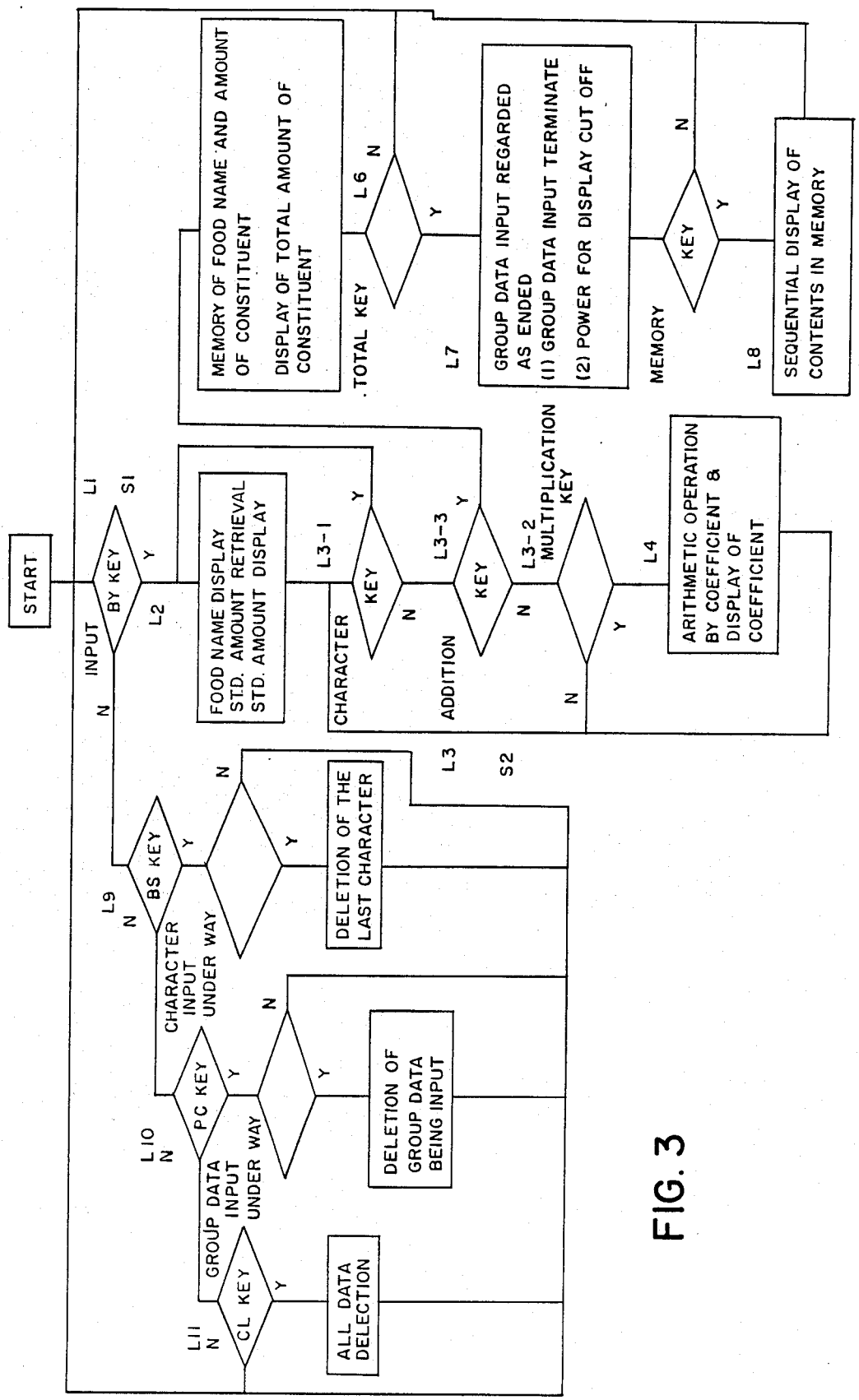
FIG. 3 is a flow chart of said system.

Referring to the flow chart in FIG. 3, the operation of the device of this invention will be described in the following. In the First Stage of operation, when a power switch is turned on, the device waits for keyed-in data from the input section. After the food-name input end key ($\alpha$) is pressed, the device moves to Step L2.

At step L2, the amounts of constituents of a food, the name of which was input, are retrieved from the food data memory which is the first memory and the retrieved data is displayed at the display section together with the food name. (If the food name has not been stored in memory, the food name only is displayed, but the amounts of constituents are not displayed.)

By the operations of the First Stage, the standard values of the amounts of constituents of the food in question can be retrieved from the stored data of a large number of foods.

In the Second Stage, the device moves to Step L3, at which any of the decisions of steps L3-1 to L3-3 is made.

In a first part of the Second Stage (Step L3-1), a decision is made as to whether or not characters were input again. If characters were input again, the device inconsistent with FIG. 3 moves back to Step L1. At this time, the food name and the amount of constituents previously displayed at the display section are cleared and the characters of the newly-input food name are displayed.

(Strictly speaking, the operations up to this point are included in the First Stage of system operation.)

In a second part of the Second Stage (Step L3-2), a decision is made as to whether or not a coefficient and and a $\times$ sign were input after Step L2. If so, the device moves to Step L4,, the amount of a constituent being displayed disappears and the keyed-in coefficient is displayed. At the same time, the figure of each constituent is multiplied by the coefficient in the arithmetic section, and the figure thus corrected and the food name are displayed. With this function, it is possible to correct the amount of each constituent which is retrieced as a standard value. For instance, if one eats three oranges by inputing $\times 3$, the figures of the amounts of constituents for one orange can be corrected to a figure for three oranges.

In a further part of the Second Stage (Step L3-3), a decision is made as to whether or not an addition (+) key was pressed after Step L2. If this is the case, the device moves to step L5 at which the food name and the amounts of constituents being displayed are cleared and they are stored in the all-input-food data memory. At the same time, the arithmetic section calculates the sum of the figure for the food name just input and the previously stored figure for the same food name. The total figure thus calculated is displayed and stored in the all-input-food data memory, and the device waits for the next command to be input.

Therefore, in the Second Stage, if a + sign is input after a corrected figure of a constituent was displayed, the operation in the Second Stage takes place on the basis of the corrected figure.

After the Second Stage is over, the device moves to Step L6. If characters are input at this point, the device moves again to Step L1 and the operations up to Step L5 are repeated.

After this, if a total (=) sign is input, the device moves to Step L7 at which the amounts of constituents of different foods in a meal are summed up to produce the total amounts of constituents of the meal, which are stored in memory. Separate totals of the amounts of constituent of different kinds of foods are calculated and stored. Further, daily totals of the amounts of constituent taken in separate meals of the day are also calculated and stored.

At Step L8, if a Memory Read key (MR) is pressed, stored data is read out one after another in a preset sequence. If the read-out sequence is set so that a total data of plural meals is displayed in the first place, this will be convenient for health control.

This function of the Second Stage makes it possible to know the amounts of constituent of various foods, the total amounts of constituents of foods of the same kind, taken on plural occasions, and the total amounts of constituents of plural meals in a day, namely breakfast, lunch, supper and snack. These pieces of information can be stored in memory. It is possible to furnish an All Clear (CL) key, Back Space (BS) key for character deletion, Group Data Deletion (PC) key and Necessary Amount (Value) key according to needs.

If the BS key is pressed, the device moves to Step L9 and the lastly-input character can be deleted. If the PC key is pressed, the device moves to Step L10 and the last group data can be deleted. If the CL key is pressed the device moves to Step L11 and all data can be deleted.

The function of the Third Stage is to perform comparison and arithmetic operations. When the = key is pressed, the amounts of constituents of foods taken in a day is compared with the necessary amount a day and an excessive or insufficient amount for each constituent is calculated and read out. Data being displayed is cleared and the excessive or insufficient amount is displayed. A key can be provided which issues a comparison command. How an excessive or insufficient amount is displayed will be described later.

In an embodiment of this invention, data can be designed in various forms to meet different needs. Some nutritive constituent amount data formats and display methods are shown below, taking an egg for example.

| | Ex. 1 of Data Format | |
|---|---|---|
| Food name | | Calorific value |
| Egg (1) | | XXX cal. |
| | Ex. 2 of Data Format | |
| Food name | Egg (1) | |
| Calorific value | XXX cal. | |
| Which nourishing effect does this food have? | | |
| Making nutrition intake complete | A family | XXX g |
| Making flesh and blood | B family | |
| Producing power and body temperature | C family | |
| Making the physical condition good | D family | |
| (Foods classified into the categories shown above) | | |
| Those which make nutrition intake complete | A family | Milk, egg, etc. |
| Those which make flesh and blood | B family | Marine products, meat, beans, bean products, etc. |
| Those which make the physical condition good | C family | Green vegetables, potatoes, fruits |
| Those which produce power and body temperature | D family | Grains, sugar, oil and fat |
| | Ex. 3 of Data Format | |
| Food name | Egg (1) | |
| Calorific value | XXX cal. | |
| Which nourishing effect does this food have? | | |
| Making flesh and blood | A family | XXX g |
| Producing power and body temperature | B family | |
| Making the physical condition good | C family | |
| (Foods classified into the categories shown above) | | |
| Those which make nutrition intake complete | A family | Fish, meat, beans, milk, egg, etc. |
| Those which produce power and body temperature | B family | Grains, sugar, oil and fat, potatoes, etc. |
| Those which make the physical condition good | C family | Green vegetables, sea-weed, mushrooms, etc. |
| | Ex. 4 of Data Format | |
| Food name | Egg (1) | |
| Calorific value | XXX cal. | |
| What is the main nutritive element that this food has? | | |
| Protein | A family | XXX g |
| Carbohydrate | B family | |
| Fat | C family | |
| Inorganic substances | | |
| Calcium | D1 family | |
| Carotin | D2 family | |
| Vitamins | E family | |
| (Foods classified into the categories shown above) | | |
| Protein | A family | Beans, fish, meat, egg, etc. |
| Carbohydrate | B family | Sugar, grains, potatoes, etc. |
| Fat | C family | oil and fats |
| Inorganic substances | | |
| Calcium | D1 family | Milk, small fish, sea-weed, etc. |
| Carotin | D2 family | Fruits, green vegetables, etc. |
| Vitamins | E family | Ex. oranges for vitamin C |
| | Ex. 5 of Data Format | |
| Food name | Egg (1) | |
| Calorific value | 156 cal. | |
| Protein | 12.7 g | |
| Carbohydrate | 0 g | |
| Fat | 11.2 g | |
| Inorganic substances | 385 mg | |
| Vitamins (esp. vitamin A) | 800 IU | |

1. Description of the Ex. 1 of Data Format

In this case, only the calorific value of food is taken up. Since the carlorific values of various foods are stored in memory, it is possible to readily check if the foods eaten is excessive or deficient in calories in comparison with the necessary calories a day. By practicing this check regularly, various geriatric diseases can be prevented. The degree of excess or deficiency may be displayed in numeric values, or in graphic forms of a human body representing degrees of obesity, or various other symbols may be used for this purpose.

2. Description of the Ex. 2 of Data Format

Comparison of calorie or nutrition intake with a required amount can be done using numbers of weight, but a more simplified method is possible, which is described in the following.

The method of calorie check by this data format is the same as in the Ex. 1 data format. For the nutrition check, as is clear from the data format, foods are classified into the categories of the functions of the contained nutritive constituents, and each food has points assigned according to the degree of each function. The necessary points of those categories per day are stored in memory and can be retrieved, to check if the calorie or nutrition intake on that day is excessive or insufficient by comparing the points of the foods taken on the day with the standard or necessary points a day. This method will be simpler and more helpful in health control than in Ex. 1. The result of comparison with the necessary amount can be displayed using colors; for example, red for the A family, blue for the B family, yellow for the C family and green for the D family. To indicate what color stands for what category, a table showing the food names and their categories may be supplied in the instruction manual for said device.

3. Description of the Ex. 3 of Data Format

This data format is a simplified version of the one in Ex. 2.

4. Description of the Ex. 4 of Data Format

In the case of Ex. 4 data format, foods are classified into the categories of nutritive constituents. A food can be put into a specified category for simplification of work according to a nutritive constituent of dominant proportion. As in Ex. 2, the amount of the weight can be used for comparison. As in Ex. 2, however, a simplified method which uses points instead of large numbers is also possible here, which makes it easier to know which nutritive constituent is excessive or insufficient and helps to take balanced nutrition.

The result of comparison can be done by use of a method of classification of nutritive constituents into a certain number of families or symbols. The meanings of the families or symbols can be explained in the instruction manual for said device.

5. Description of the Ex. 5 of Data Format

In the case of the Ex. 5 data format, said device provides detailed information about the respective nutritive constituents, which will be convenient for persons who need to know the exact amounts of nutritive constituents contained. This case, however, requires a greater memory capacity, As has been described in the foregoing, by a system of according to this invention it is possible to instantly retrieve the amount of nutritive constituents of a food in question from stored data of a large number of foods in order to correct the amount of a constituent according to the actual amount or quantity of food eaten. It is also possible to store the amounts of a constituent in separate totals for different kinds of foods, and also to calculate the total amounts of constituents of meals a day.

Depending on the method of data classification, said system can be applied in a small, portable unit or in equipment of considerable size, each of which can provide accurate and detailed information on nutrition.

As a device to apply said system, a small, character-input calculator can be made, which allows data to be input and displayed directly by food names. Said calculator, which indicates and stores the amounts of constituents in a meal or plural meals, and which shows the amounts of excess or deficiency in nutrition, will contribute a great deal to health control.

This invention can be embodied as a multi-functional equipment, the composition of which is omitted in this description of the invention, but can be designed readily using the prior art. Needless to say, the mode of embodiment of this invention can be changed within the range of the description of this invention.

What is claimed is:

1. A portable food constituent amount display calculator which, when commanded, compares the total amount of at least one constituent of foods taken in per day with the necessary amount of each said constituent a day and displays the amount of each excess or deficiency for health control, comprising an input section provided with a character-input keyboard for inputing names of food taken in by a user during the day, and for selectively indicating a plural number of a standard amount of said at least one constituent thereof;

A food-data memory in which said food names and each said standard amount of each said constituent thereof are prestored;

means by which to read out from said food-data memory said standard amount of each said constituent of a food name which is input from the keyboard;

a display which shows an input food name and each said standard amount of each said constituent read out from the food-data memory and results of comparison and arithmetic operations;

an arithmetic and control section which performs said arithmetic operations, including adding the respective amounts of each said constituent of said foods taken in the day to form at least one respective total for the day for each said constituent;

an all-input food data memory which stores said food names and amounts of said constituents which are displayed and each said total from said arithmetic operations;

a necessary-constituent-amount memory which stores the necessary amount of each said constituent of each said stored food name; and comparison means for comparing the respective necessary amount of each said constituent and the respective total from said arithmetic operations stored in said all-input data memory.

2. The calculator of claim 1, comprising means for displaying in said display the amount of surplus or deficiency of each said constituent based on a respective comparison operation of said comparison means for each said constituent, in graphic form.

3. The calculator of claim 1, each said food name stored in said food-data memory being group into a respective one of a predetermined plurality of predetermined familes, comprising means of displaying in said display the amount of surplus or deficiency of said comparison operation in a different respective color for each said family, wherein at least predetermined ones of each said constituent corresponds to respective different ones of said familes.

4. A system for determining the amount of each of a plurality of constituents in foods taken in by a consumer during a day, comprising
a first memory having stored therein names of foods and information on the respective amounts of each of said constituents in a standard amount of each said food having its name stored therein,
a second memory having stored therein nominal recommended daily amounts of said constituents for said consumer,
a keyboard section for inputing names of food consumed during the day by said consumer, and for inputing information on the amount of each said food consumed if different from said standard amount in units of said standard amount, said keyboard section including a total key, a comparison command key and a memory command key,
a display for displaying each said input food name and the respective standard or different amount of each said constituent therof,
a third memory for storing each said input food name and amount and current totals of each of said constituent for each said food consumed during the day, each said food with a different name having a respective different total for each said constituent thereof, and
an arithmetic section for adding said displayed amounts of constituents for an input food name to the current totals in said third memory,
wherein (1) when said total key is depressed while said input food name and the respective amounts of said constituents are displayed, said arithmetic section performs said adding, the displayed data is cleared, and the new totals from said adding are stored as the updated values of said current totals in said third memory, (2) when said comparison command key is operated the excess or deficiency of each said constituent for the day is calculated and displayed, and (3) when said memory read key is depressed, said stored totals from said third memory are read out and displayed in said display in a predetermined sequence.

5. A system as in claim 4, comprising a control section connected at a first terminal to a first terminal of said input section and at a second terminal to a first terminal of each of said arithmetic section and first and second memories, said display section being connected at a second terminal to a second terminal of said arithmetic section, and said arithmetic section being connected at a third terminal to a second terminal of each of said first and second memories, and at a fourth terminal to a first terminal of said second memory.

6. The system of claim 4, wherein each said memory is commonly provided by a single memory means.

7. A system for determing the amounts of each of a plurality of constituents in foods taken in by a consumer in each of various meals of a day, and a respective daily total for each said ingredient, said system comprising
a first memory having stored therein names of foods and information on the respective amounts of each of said constituents in a standard amount of each said food having its name stored therein,
a keyboard section for inputing names of food consumed during the day by said consumer, and for inputing information on the amount of each said food consumed if different from said standard amount in units of said standard amount, said keyboard section including a total key and a memory command key,
a display for displaying each said input food name and the respective standard and each said different amount of each said constituent therof,
a second memory for storing each said input food name and current totals of each said constituent for each said food consumed for each said meal during the day and each said daily total, and
an arithmetic section for adding said displayed amounts of constituents for an input food name to the respective current totals in said second memory,
wherein (1) when said total key is depressed while said input food name and the respective amounts of said constituents are displayed, said arithmetic section performs said adding, the displayed data is cleared, and the new totals from said adding are stored as the updated values of said current totals in said second memory, and (2) when said memory read key is depressed, said stored totals from said second memory are read out and information corresponding to each said stored total read out from said second memory is displayed in said display in a predetermined sequence.

8. The system of claim 7, wherein each said memory is commonly provided by a single memory means.

9. The system of claim 7, comprising
a third memory having stored therein recommended daily amounts of said constituents for said consumer,
wherein said arithmetic section selectively compares said recommended daily amounts of said constituents with each respective daily total, and said information displayed in said predetermined sequence upon said operation of said memory read key indicates an excess or defficiency of each said ingredient for said consumer for the day.

10. The system of claim 9, said keyboard section comprising a comparison key for actuating the comparison of said daily totals of each said ingredient with said recommended daily amounts.

11. The system of claim 7, wherein each said information displayed in said predetermined sequence is the amount of each said ingredient, in a corresponding absolute unit.

12. The system of claim 7, wherein respective ones of said ingredients are each characterized by a respective nutritive function.

13. The system of claim 7, wherein each said information displayed in said predetermined sequence is in terms of points assigned in relation to said standard amount of each said ingredient.

14. The system of claim 7, wherein each said information displayed in said predetermined sequence is in terms of points assigned in relation to a recommended daily amount of each said ingredient.

15. The system of claim 7, comprising
said keyboard section including an end key, an addition key, a multiplication key, a back-space key, a deletion key and a clear key,
wherein the system operates so that:
each said food name for each said meal is entered by said keyboard means;

after each respective one of said food names has been entered, and said end key is pressed, said display shows the respective food name and said standard amount;

if said keyboard means is operated to indicate another one of said food names, after entry of a food name and said pressing of said end key, the new food name is displayed in said display after entry of the new food name and a further pressing of said end key;

upon actuation of said addition key, after entry of a food name and an operation of said end key, said food name and amount displayed are added to the respective totals for said food name in said second memory;

upon actuation of said multiplication key and entry of a coefficient for indicating the number of respective standard units of the respective ingredient of the respective food, after entry of a food name and an operation of said end key and before actuation of said addition key, the respective different amount of said food from the respective standard amount is displayed with the food name and added to said current totals when said addition key is pressed;

the pressing of said total key is taken as indicating the completion of entry of food names and amounts for a group of foods for said consumer;

when said back-space key is pressed, during the input of a food name and before said end key is pressed, the last-entered character of the food name is deleted;

when said delete key is pressed, during the input of a food name and prior to the pressing of said end key, and prior to the pressing of said total key, all the food names and amounts stored in said second memory during the current data entry session are deleted from said second memory, as all being data of the respective group for said consumer; and when said clear key is pressed, in a pause in said input of a food name and prior to the pressing of said end key, all said data stored in said second memory is deleted.

16. The system of claim 15, wherein power for said display is cut off when said total key is pressed, and restored after said memory read key is pressed for said sequential display and for display of the next food name entered.

* * * * *